United States Patent [19]

Crosby, Jr.

[11] 3,976,268

[45] Aug. 24, 1976

[54] TETHERED BALLOON MOORING MEANS

[75] Inventor: Edward L. Crosby, Jr., Indialantic, Fla.

[73] Assignee: The United States of America as represented by the Secretary of the Air Force, Washington, D.C.

[22] Filed: Apr. 8, 1975

[21] Appl. No.: 566,163

[52] U.S. Cl. .............................................. 244/115
[51] Int. Cl.² ......................................... B64F 1/12
[58] Field of Search .................... 244/33, 115, 116

[56] References Cited

UNITED STATES PATENTS

| | | | |
|---|---|---|---|
| 1,356,245 | 10/1920 | Watt | 244/115 |
| 1,488,336 | 3/1924 | Gentzcke | 244/115 |
| 1,619,680 | 3/1927 | Richmond et al. | 244/115 |
| 1,629,374 | 5/1927 | Avorio | 244/33 |
| 2,150,428 | 3/1939 | Crum et al. | 244/115 |

FOREIGN PATENTS OR APPLICATIONS

| | | | |
|---|---|---|---|
| 933,120 | 4/1948 | France | 244/33 |
| 352,837 | 5/1922 | Germany | 244/115 |
| 594,596 | 3/1934 | Germany | 244/33 |

Primary Examiner—Stephen G. Kunin
Assistant Examiner—Galen L. Barefoot
Attorney, Agent, or Firm—Joseph E. Rusz; Arsen Tashjian

[57] ABSTRACT

Four anchored rope lines which are arranged as boundary vertices of an equilateral square pyramid, terminate at a four way shackle connected through a short line to a hook. The hook terminates lines on the nose of the balloon which are secured by an appropriate number of nose patches, two or three on each side or in the center of the balloon nose. Conventional mooring ropes are tethered to a monorail arrangement in a conventional manner. The four anchored rope lines replace the cumbersome mooring tower and eliminate the necessity of a protective nose framework on the balloon. In another embodiment the four rope lines are secured directly to the nose patches through the four way shackle and carried aloft with the balloon. At the time of mooring the lower ends of each rope line need merely to be connected to appropriate ground terminals.

3 Claims, 1 Drawing Figure

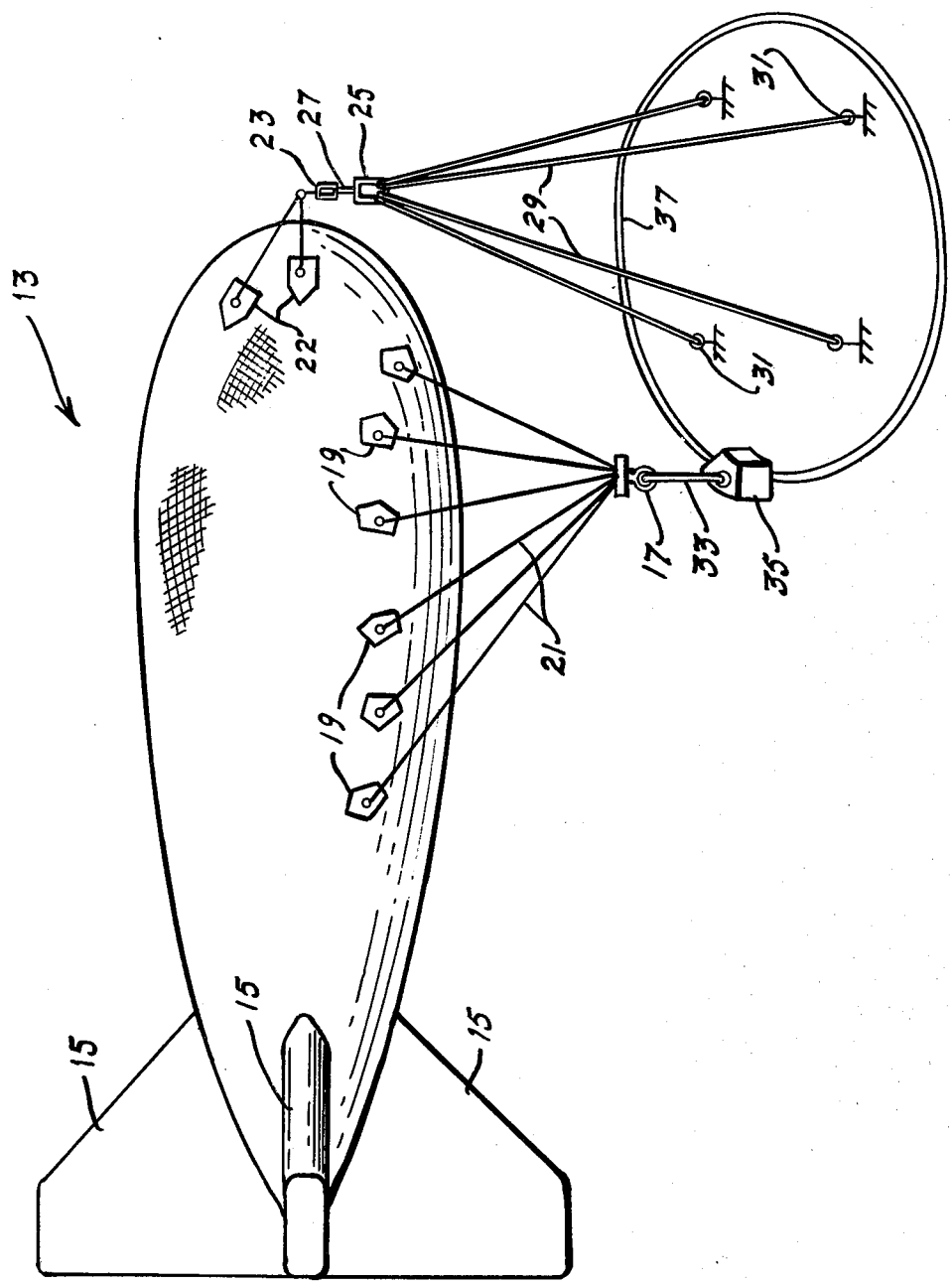

TETHERED BALLOON MOORING MEANS

STATEMENT OF GOVERNMENT INTEREST

The invention described herein may be manufactured and used by or for the Government for governmental purposes without the payment of any royalty thereon.

BACKGROUND OF THE INVENTION

This invention relates to method and means for mooring a tethered balloon and, more particularly, the invention is concerned with providing a four rope equilateral square pyramid arrangement attached to the nose of a balloon for mooring the balloon without the necessity of a mooring mast and accompanying massive nose structure.

Tethered aeroform balloons can be moored by brute force methods and by weathervane or windward systems. Brute force mooring is accomplished by tying the balloon to the ground, immobile, and may be performed by ropes, nets or use of a large pit. These techniques are unsatisfactory primarily because of the excessive danger of damage to the balloon and because of the danger of injury in high wind conditions. Of the weathervane systems, the use of a gondola which is detachable for flight is one method although not applicable to the present invention as will be understood later. Another system presently in use is the monorail and it will be considered in detail below. Both of these last-named systems as well as any other weathervane system use a tower or mast to which the balloon is attached. Of these two systems the gondola method has a significant disadvantage, namely, that is does not mechanically anchor the balloon to the ground, this function being performed only by the tower attachment. This attachment point is neither strong enough nor correctly placed to resist the forces induced by gusty strong winds. Another problem with the gondola mooring system is that it must be attended, that is, a watchman is required to add or remove ballast to ensure that the balloon remains horizontal as temperature variations change the net lift or buoyancy due to gas expansion.

Now considering the monorail system, the balloon being buoyant exerts a relatively large upward pull on the dolly and on the masthead. The force is greater than the payload capacity, the weight of the tether cable, plus the free-lift margin. An upward force of several thousand pounds is commonplace and is distributed between the confluence point and the masthead. The balloon is ordinarily flown at a positive pitch angle of 10° to 15° for aerodynamic reasons. This angle is established by the distance forward or back the confluence point is rigged for a given weight and balance configuration. It would be desirable to reduce the upload on the mast to some very low value but this would obviously require re-rigging the balloon for mooring by moving the confluence point forward which is operationally inconvenient. Another way of reducing mast tension is to hang ballast on the nose which is both inconvenient and structurally undesirable. In a typical monorail mooring system the mast height is about 39 feet, eight steel guy cables are used at an interior base angle of about 60° and the added nose structure on the balloon weighs about 600 pounds. The mast, the guys and the circular monorail are fixed to the ground with ground-anchors and/or poured concrete piers.

Although the nose structure is used only for mooring, it is carried by the balloon in flight. It is thus a functionally unnecessary flight component which adversely affects the balloons altitude and payload capability. It is also expensive and very time consuming to install. Consequently, it would be most desirable to dispense entirely with the nose structure and while so doing, it would also be desirable to eliminate the necessity of providing a mast tower. The sole function of the nose structure is to protect the nose of the balloon from damage by the tower. A proposed solution to the problem was to position a large cup on the tower. Although the principal disadvantage is thus avoided, it neither is simple, inexpensive nor convenient. In order to eliminate the nose structure, it is first necessary to eliminate the mast.

Under conditions of no wind, the tower operates in tension only and, in fact, the guys are unnecessary. The tower restrains the balloon from assuming its normal 10°–15° nose-up attitude. Usually the wind is blowing and the balloon pivots around the tower so as to head upwind. The latch rotates and the dolly rides around the monorail as the balloon responds to the wind azimuth. If the wind is steady in direction and speed, the side forces on the tower are small. In gusty winds however, the drag load of the balloon can impose suprisingly large loads on the tower. A sudden reduction in velocity, for example, will cause the balloon to springback and ram the tower. Also, a sudden change in the wind azimuth will put a large side load on the tower. The response time of balloon is long because of its high inertia and during the time it is righting itself, the reaction on the tower is large. Obviously, one reason that the side force is so large is that the tower is rigid and fixed. Thus, it would be most desirable to provide a structural arrangement which would restrain the steady-state upward force while at the same time permitting moderate but limited lateral movement of the nose. By allowing this small lateral freedom, little of the high reaction force would develop, yet the long term azimuth pivot requirement would be met.

SUMMARY OF THE INVENTION

The present invention is concerned with providing an improved system for mooring an aeroform balloon which provides azimuth freedom and other desirable features of present systems without requiring mast or nose structures.

In a typical embodiment of the invention, four anchored rope lines are arranged as the bounding vertices of an equilateral square pyramid. The upper ends of the rope lines terminate in a four-way shackle which is connected either through a short painter or directly to a hook. The hook terminates lines on the balloon nose which are secured by an appropriate number of load patches, also called nose patches. In a typical 200,000 cubic foot balloon, the load patches have a maximum load rating of 4000 pounds each, so that three such patches on each side of the nose would be ample. The structural details given can be considered exemplary. The invention resides in the basic geometry and the detailed hardware arrangements can have considerable variations.

The side movement of the balloon will cause the nose to describe an arc whose radius is the windward anchor rope which is in tension while the leeward rope goes slack. Thus, by responding to an off-axis gust, the nose is forced down somewhat. This dissipates the force because it is constrained to oppose the buoyancy.

Accordingly, it is an object of the invention to provide a tethered balloon mooring means wherein the massive complex nose structure of the balloon can be eliminated making the balloon substantially lighter allowing a corresponding increase in the payload or, alternatively, a 25 per cent increase in maximum altitude.

Another object of the invention is to provide a balloon mooring system wherein the elimination of the complex nose structure reduces the assembly time in setting up the balloon to an absolute minimum greatly increasing the logistic mobility.

Still another object of the invention is to provide a tethered aeroform balloon mooring system wherein the elimination of the balloon nose structure results in a substantial reduction in the cost and labor involved in the preparation of an operational unit.

A further object of the invention is to provide a balloon mooring system wherein the conventional mast and latch arrangement is eliminated thereby decreasing costs while at the same time improving logistic mobility and eliminating the danger of collision with the tower during launch and docking especially during high winds.

A still further object of the invention is to provide a balloon mooring system which does not require the presence of a mast in the pad area thereby allowing full ground vehicle movement in the docking area and uncluttered use thereof.

Another still further object of the invention is to provide a balloon mooring system wherein the balloon nose structure is eliminated making the balloon less attractive to lightning in flight and the mast is eliminated making the mooring structure less attractive to lightning on the ground.

Still another object of the invention is to provide a balloon mooring system wherein the heavy nose structure of the balloon is eliminated causing a decrease of the nose weight and permitting more forward location of the confluence point which improves the yaw stability of the balloon in flight.

These and other objects, features, and advantages will become more apparent after considering the following description taken in conjunction with the annexed drawing and appended claims.

BRIEF DESCRIPTION OF THE DRAWING

The FIGURE is a general view of a tethered balloon mooring system according to the invention showing the balloon in the docked position with the tether line and payload removed.

DESCRIPTION OF A PREFERRED EMBODIMENT

Referring now to the drawing, there is shown an aeroform balloon 13 of a size and configuration, for example, on the order of 200,000 cubic feet capacity and includes a plurality of stabilizing fins 15 operatively secured to the rearward end thereof. The balloon 13 is particularly suited for operation on a tether cable (not shown) which is normally attached at the confluence point 17 during flight. A series of load patches 19 are positioned on both lower sides of the balloon 13 with a corresponding series of suspension lines 21 extending between the load patches 19 and the confluence point 17. A series of nose patches 22 are positioned at the forward or nose portion of the balloon 13 with lines extending therefrom to a hook member 23. Each of the nose patches 22 have a maximum load rating of 4000 pounds so that three patches on each side of center would normally be ample to support a 200,000 cubic foot balloon. A four way shackle 25 may be attached to the hook member 23 through a short painter 27 or in the alternative, may be attached directly to the hook member 23. In the embodiment shown, four rope lines 29 are arranged as the bounding vertices of an equilateral square pyramid. The lines 29 extend between the four way shackle 25 and the ground anchors 31 which are preferably imbedded in concrete. Directly beneath the confluence point 17 and attached thereto by the line 33 is located a trolley or dolly 35 which rides on a circular monorail 37. The ground anchors 31 which serve to restrain the rope lines 29 are located within the circular monorail 37 so that the trolley 35 can travel a complete 360° revolution around the center of the monorail 37 in response to changes in wind direction. The hook member 23 is normally positioned directly over the center of the monorail 37 so that the rope lines 29 which are met at the four way shackle 25 form a substantially equilateral square pyramid configuration when the balloon 13 is moored in position.

MODE OF OPERATION

In operation, the tethered aeroform balloon 13 is lowered by a suitable tether winch (not shown) until the upper end of the line 33 can be attached at the confluence point 17, the lower end of the line 33 being affixed to the trolley 35. The tether line can then be removed from the balloon 13. After the attachment to the trolley 35 has been completed, the four way shackle 25 with the lines 29 attached thereto is lifted by means of a high-ranger or so-called cherry-picker and hooked to the hook member 23 on the nose of the balloon. The docking operation is now complete.

Another arrangement for docking the balloon 13 is to fixedly attach the apex of the pyramid of the nose anchor lines 29 and carry them in flight. To dock, after attaching the line at the confluence point 17 to the trolley 35, the crew merely attaches the lower ends of the anchor lines 29 to the ground anchors 31. The weight of the line assembly would be inconsequential, about 50 pounds maximum for 15,000 pound rope. The lines could be reefed-up during launch operations so as not to hang free and then reefed-down during the docking procedure. Thus, simple and relatively troublefree systems for docking a tethered balloon have been disclosed. All but a trifling backward and forward movement is restrained by the monorail 37 and suspension lines 21. As for high side forces from off-axis gusts, there is no tower to cramp the balloon from minor sideways movement so that large forces never develop. The response of the balloon is slow so little movement will occur during the gust.

Although the invention has been illustrated in the accompanying drawing and described in the foregoing specification in terms of preferred embodiments thereof, the invention is not limited to these embodiments or to the preferred configuration outlined. It will be readily apparent to those skilled in the art that my invention is suitable for use with balloons of different static characteristics by adjustment of the various parameters to provide optimum geometric conditions. For example, three anchor lines would be the minimum number necessary and more than five or six would be unnecessary. Also, the more slender the pyramid, the more nose movement is allowed. The painter line 27 shown between the shackle 25 and the hook 23 has the same effect although the locus of movement would be a different arc. With no such line or painter 27, the base spread of the anchor lines 29 is limited by the interference with the balloon 13. Without this limitation, as for instance with a long painter and a short pyramid, the limit on the base spread is the monorail diameter.

Having thus set forth the nature of my invention, what I claim and desire to secure by Letters Patent of the United States is:

1. In a system for mooring a tethered aeroform balloon having a plurality of load patches fixedly attached to both lower sides of said balloon, a corresponding plurality of suspension lines extending from said load patches to the confluence point of said lines, a trolley positioned directly under the confluence point, a circular monorail in operative engagement with said trolley, and a line between said trolley and the confluence point, the improvement comprising a series of nose patches fixedly attached to the nose portion of said balloon, a corresponding series of lines one each extending forward from said nose patches beyond the nose of said balloon, a hook member positioned at the nose of said balloon to receive said series of lines from said series of nose patches, a four way shackle operatively connected to said hook member, means connecting said four-way shackle to the ground consisting of a plurality of flexible rope lines extending downward from said four way shackle to reach the ground and a corresponding plurality of ground anchors symetrically positioned within the circular monorail each receiving one rope line from said four way shackle for fixed attachment thereto, such that the said rope lines attached between said four way shackle and said ground anchors form an equilateral pyramid configuration for effectively docking the balloon without the use of a tower mast and massive complex nose structure.

2. The improved mooring system defined in claim 1 wherein a painter line is positioned between said four way shackle and said hook member.

3. The improved mooring system defined in claim 1 wherein said plurality of rope lines extending downward from said four way shackle is in the form of an equilateral square pyramid formed by four rope lines, the lower ends of said rope lines being fixedly attached to four ground anchors, one each positioned at the corner of a square.

* * * * *